United States Patent Office

2,704,261
Patented Mar. 15, 1955

2,704,261

MACHINABLE CERAMIC AND PROCESS OF MANUFACTURE

Jay E. Comeforo, Norris, Tenn.

No Drawing. Application August 6, 1952,
Serial No. 303,013

4 Claims. (Cl. 106—39)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (ch. 460, 45 Stat. L, 467).

This invention relates to a machinable ceramic dielectric material and to a process for its manufacture, and, more particularly, to a product of this type composed of synthetic mica and to a process of bonding and consolidating ground synthetic mica into machinable ceramic articles.

It has long been known that flakes of mica can be fabricated to form a larger sheet by using a bonding material such as shellac, varnish, sodium silicate, and the like, or by a combination of bonding ingredients, and subjecting the bonded mica to heat and pressure. However, the presence of these bonding agents usually has a deleterious effect on certain of the properties of the sheet formed.

Certain synthetic micas, as for example, the fluorine micas, are more stable thermally than natural micas. In order to take advantage of the superior properties of the synthetic micas and avoid the effects associated with known bonding agents, it has been proposed to fabricate these micas without the use of binders by means of a hot-pressing technique. The material produced by hot-pressing has a number of desirable properties. However, hot-pressing methods are relatively expensive, and the cost of the equipment increases rapidly as the size of the ceramic article to be produced increases. The size of the articles that can be produced by this method therefore is limited.

Accordingly, an object of this invention is to provide an inexpensive method of fabricating synthetic mica into machinable ceramic articles of good dielectric properties, high heat resistance, and good chemical stability.

Another object of this invention is to provide a method for fabricating synthetic mica into machinable ceramic articles of any desired size.

A further object of this invention is to provide a method for bonding synthetic mica by use of a bonding agent that reacts with the mica but does not deleteriously affect the heat resistance, electrical properties, machinability, and chemical stability of the resulting product.

A still further object of this invention is to provide a strong, glass-free, machinable, bonded mica article capable of withstanding high temperatures and having good electrical insulating properties.

Other objects and advantages of this invention will appear as the description proceeds.

The process of this invention comprises mixing a suitable ground synthetic mica with ortho phosphoric acid or with a solution of a salt of this acid, forming the mixture into the desired shape by pressing, and then heat-treating the resulting product.

In accordance with the invention, it has been discovered that when synthetic micas are mixed with phosphoric acid or with a phosphate solution without further bonding ingredients a reaction occurs and a satisfactory bond is produced. The reaction mixture may be formed into the desired shape by pressing without heating and when the pressed article is subsequently fired it becomes a strong, machinable mica-ceramic, having desirable electrical properties and is not adversely effected by the bonding agent.

While natural hydroxyl-micas may be capable of reaction with the phosphates used in the process of this invention, these micas mixed with phosphoric acid alone do not produce a ceramic material of satisfactory mechanical strength and chemical resistance when cold-pressed and subsequently fired. The natural micas decompose at a temperature below that at which a suitable bond can be developed.

Orthophosphoric acid or salts of this acid are preferred for admixture with the synthetic micas because they are more stable than other phosphates when stored as an aqueous solution prior to the mixing operation. Other phosphates such as the meta and pyrophosphoric acids and salts may be used, but present no special advantages over the use of the orthophosphates. Suitable orthophosphate salts that may be used in place of $H_3PO_4$ are, for example, $Al(H_2PO_4)_3$ and $Be(H_2PO_4)_2$. These salts contain cations capable of entering the structure of synthetic fluor-micas as will be apparent from the description hereinafter.

Synthetic mica, suitable for the purposes of this invention may be prepared either by reaction in the solid state or by crystallization from melts. Suitable mica compositions that can be prepared in this manner are the synthetic fluorine micas, as for example, the so-called "normal" fluorine phlogopite mica, of a composition corresponding to the formula $KMg_3AlSi_3O_{10}F_2$. This material may be prepared by melting materials such as $K_2SiF_6$, $MgO$, $Al_2O_3$ and $SiO_2$ or others providing the necessary components, in the proportions indicated by the formula, under conditions minimizing volatilization of the fluorides, and then crystallizing the mica from the melt by slow cooling. Fluorine-micas of this type crystallize readily from a melt of similar composition.

The synthetic fluorine-mica family is inclusive of an extensive series of compounds obtainable by substitution of other ions in the phlogopite structure on the basis of well-known crystal chemical laws. For example, the potassium ion of $KMg_3AlSi_3O_{10}F_2$ can be completely replaced with sodium, rubidium, thallium, cesium, calcium, strontium, barium, and lead. The magnesium can be replaced completely with ferrous iron, cobalt, and nickel; by about two-thirds with divalent manganese; by about one-third with lithium and divalent titanium; and about one-sixth with zinc and copper. The aluminum can be replaced with beryllium, boron, ferric iron, trivalent manganese, vanadium, silicon, and in part with chromium. The silicon can be completely replaced with germanium. Other ions may be silver, cadmium, lanthanum, neodymium, tetravalent titanium, scandium, gallium, columbium, and chlorine.

The synthetic mica, prepared, for example, by the method described above, is ground by conventional methods to minus 60 mesh. Coarser ground material may be used, but the product produced is slightly more difficult to machine to sharp dimensions. The powdered mica is then intimately mixed with phosphoric acid or with a solution of its salts, and then formed into the desired shape by pressing. As a result of this procedure the mica particles are randomly arranged in the compacted mass. From 5 to 15 per cent by weight of 85 per cent $H_3PO_4$ is preferred but other concentrations and proportions may be satisfactorily employed. Phosphate bonded products may be prepared using as little as 2 per cent of 85 per cent $H_3PO_4$ plus sufficient moisture to impart proper pressing characteristics. However, stronger, more dense mica ceramics are more readily obtained by using a phosphate content corresponding to about 5 to 10 per cent by weight of $H_3PO_4$. Additions of appreciably more phosphate than 10 per cent shorten the temperature range within which dense, nearly impervious mica-ceramics may be produced, without improving the mechanical strength or electrical properties of the mica-ceramic.

The pressed article is enclosed in a suitable container or muffle to retard the loss of volatile constituents and heated to a temperature of 900–1300° C. depending upon the porosity desired in the final product. The pressure of forming and temperature of firing control to some extent the properties of the finished article. If, for example, a dense, impervious mica-ceramic is required, a forming pressure of about 10,000 pounds per square inch or greater followed by firing or baking to a temperature in excess of 1000° C. would be employed. The pressure applied to form the phosphate-bonded mica may be varied from less than 1000 pounds per square inch to as high as practical, as for example, to 50,000 pounds per square inch and higher. The pressure employed is dependent upon the use intended for the mica ceramic. For a heat insulator, as an example, low pressures would be used.

The invention will be further illustrated but is not intended to be limited by the following examples of practice:

*Example I*

Specific conditions:
- Composition of synthetic mica.  $KMg_3AlSi_3O_{10}F_2$ (so-called "normal" mica).
- Phosphate binder  10% by weight of 85% $H_3PO_4$.
- Forming pressure  10,000 p. s. i.
- Firing temperature  1230° C. with 90 minute soak.

Properties of product:
- Per cent water absorption  4.2%.
- Per cent total shrinkage  3.5%.
- Dielectric constant  4.3.
- Power factor  0.005.
- Modulus of rupture  Greater than 5,000 p. s. i.

*Example II*

Specific conditions:
- Composition of synthetic mica.  $KMg_{2\ 1/2}Si_4O_{10}F_2$ (so-called tetra-silicic mica).
- Phosphate binder  10% by weight of 85% $H_3PO_4$.
- Forming pressure  10,000 p. s. i.
- Firing temperature  1230° C. with 90 minute soak.

Properties of product:
- Per cent water absorption  4.22%.
- Per cent total shrinkage  Zero (this is probably most important feature of this composition).
- Dielectric constant  4.5.
- Power factor  0.002.
- Modulus of rupture  Approx. 4,000 p. s. i.

*Example III*

Specific conditions:
- Composition of synthetic mica.  $KMg_3AlSi_3O_{10}F_2$ (same as Example I).
- Phosphate binder  10% by weight of 50% $Al(H_2PO_4)_3$.
- Forming pressure  10,000 p. s. i.
- Firing temperature  1230° C. with 90 minute soak.

Properties of product:
- Per cent water absorption  6.0%.
- Per cent total shrinkage  3.0%.
- Dielectric constant  4.3.
- Power factor  0.004.
- Modulus of rupture  4,000 p. s. i.

Since the mixture is formed cold employing the same techniques as is common practice with electrical porcelain, steatite, and cordierite, the size of the article is not limited by the capacity of hot pressing equipment. The fired product is free from glass, relatively soft and tough, and therefore may be readily machined. Its properties render it ideal for use as tube spacers and power tube insulators, heating element supports, as a substitute for block talc, as heat insulating material, for preparation of models by cutting from a larger mass, and for all uses for which good electrical insulating properties, machineability and strength are desired.

It will be appreciated from a reading of the foregoing specification that the invention herein described is susceptible of various changes and modifications without departing from the spirit and scope thereof.

What is claimed is:

1. The process of producing a machinable mica-ceramic which comprises mixing about 85 to 98 percent by weight of finely divided synthetic fluorine-mica of the approximate composition $KMg_{2\ 1/2}Si_4O_{10}F_2$ and of a fineness of about minus 60 mesh with about 2 to 15 percent by weight of a material selected from the group consisting of orthophosphoric acid and salts thereof, forming the mixture into a ceramic article by cold pressing, and thereafter heat-firing the formed article at a temperature of from about 900° C. to 1300° C. at atmospheric pressure to complete the chemical bond of the phosphate with the mica.

2. The process of producing a machinable mica-ceramic which comprises mixing about 85 to 98 percent finely divided synthetic fluorine-mica of the approximate composition of $KMg_{2\ 1/2}Si_4O_{10}F_2$ and of a fineness of about minus 60 mesh with about 2 to 15 percent of about 85 percent $H_3PO_4$, forming the mixture into a ceramic article by cold pressing at a pressure of from about 1000 to 50,000 pounds per square inch, and heat-treating the formed article at a temperature within the range of from about 900° C. to 1300° C. at atmospheric pressure to complete the chemical bond of the phosphate with the mica.

3. The process of producing a machinable mica-ceramic which comprises mixing about 85 to 98 percent of finely divided synthetic fluorine-mica of the approximate composition of $KMg_{2\ 1/2}Si_4O_{10}F_2$ and of a fineness of about minus 60 mesh with about 2 to 15 percent of $H_3PO_4$ of about 85 percent concentration, forming the mixture into a ceramic article by applying a pressure of about 10,000 pounds per square inch to the mixture, and heat-treating the formed article at a temperature of about 1000° C. at atmospheric pressure to cause the phosphate to chemically bond with the mica.

4. A ceramic composition consisting essentially of finely divided particles of synthetic fluorine-mica of the approximate composition of $KMg_{2\ 1/2}Si_4O_{10}F_2$ chemically-bonded by about 2 to 15 percent by weight of phosphate.

References Cited in the file of this patent

UNITED STATES PATENTS

| Number | Name | Date |
|---|---|---|
| 1,578,812 | Dawes et al. | Mar. 30, 1926 |
| 1,975,078 | Boughton | Oct. 2, 1934 |
| 2,016,274 | Boughton | Oct. 8, 1935 |
| 2,113,533 | Boughton et al. | Apr. 5, 1938 |
| 2,516,983 | Hatch | Aug. 1, 1950 |

FOREIGN PATENTS

| Number | Country | Date |
|---|---|---|
| 539,708 | Great Britain | Oct. 15, 1940 |